No. 883,296. PATENTED MAR. 31, 1908.
E. O. COOK.
PIE TIN.
APPLICATION FILED AUG. 27, 1906.
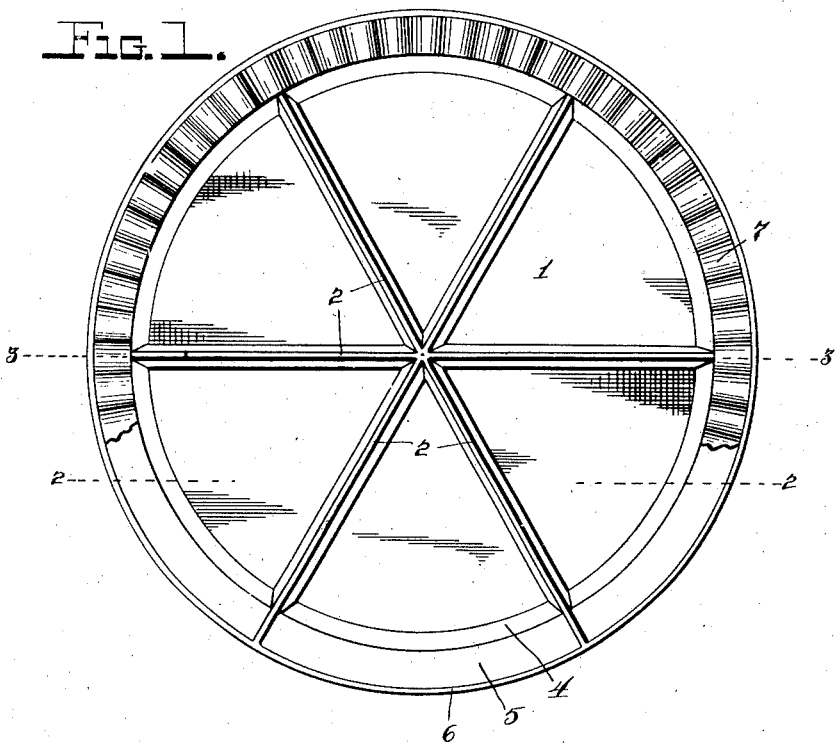
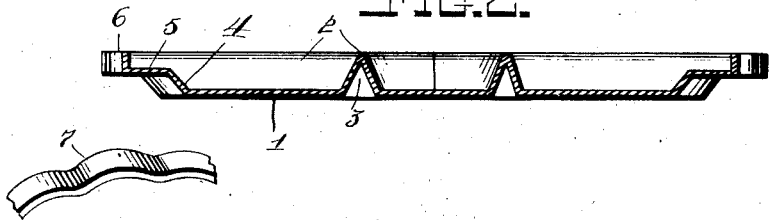
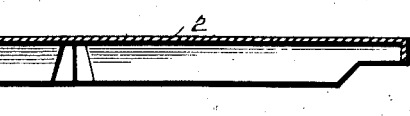 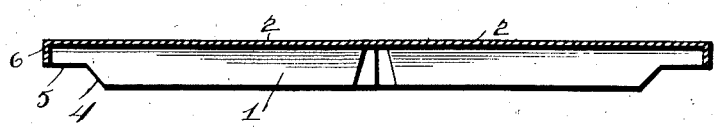
Witnesses
Inventor
E. O. Cook.
by Attorneys

UNITED STATES PATENT OFFICE.

ETHEL OTIS COOK, OF NORMAN, OKLAHOMA.

PIE-TIN.

No. 883,296.　　　Specification of Letters Patent.　　Patented March 31, 1908.

Application filed August 27, 1906. Serial No. 332,259.

*To all whom it may concern:*

Be it known that I, ETHEL OTIS COOK, a citizen of the United States, residing at Norman, in the county of Cleveland, Oklahoma, have invented certain new and useful Improvements in Pie-Tins; and I do declare the following to be a full, clear, and exact description of the invention, such as will enable others skilled in the art to which it appertains to make and use the same.

This invention relates to improvements in pie plates or tins, and consists in the novel construction, combination and arrangement of parts hereinafter described and claimed.

The object of the invention is to provide a simple and practical device of this character, in which a pie or the like may be baked in a plurality of sections, so that it will not be necessary to cut the pie and there will be no loss of the contents of the sections or slices when they are removed.

A further object of the invention is to provide a device of this character with means whereby the pie may be more quickly made.

A still further object is to provide a device of this character, in which the bottom crust and especially the sides of the sections or sectors of the pie will be more thoroughly baked.

The above and other objects which will appear as the nature of the invention is better understood, are accomplished by the construction illustrated in the accompanying drawings, in which:—

Figure 1 is a plan view of the improved pie plate, showing the crimping ring thereon and partly broken away; Figs. 2 and 3 are vertical transverse sectional views taken, respectively, on the planes indicated by the lines 2—2 and 3—3 in Fig. 1, the crimping ring being omitted; and Fig. 4 is a detail perspective view of a portion of the crimping ring.

Referring to the drawings by numeral, 1 denotes the pie plate or tin, here shown as circular in form and divided into six sections by vertically-extending, radial partitions 2 formed by upbent corrugations in the plate bottom. It will be understood, however, that the plate may be of any shape and divided into any number of sections. The partitions 2, which radiate from the center of the plate, are of V-shape in cross section, as clearly shown in Fig. 2, so that spaces 3 are formed between their upwardly converging walls to permit of the passage of heat therethrough and thus insure the thorough baking of the pie crust. The rim of the pan 1 has an upwardly and outwardly extending portion 4, a horizontally laterally-extending portion 5, and a vertically extending flange or lip 6. The flange or lip 6 has its upper edge in the plane of the upper edges of the partitions 2, so that after the crusts have been placed upon the pan, as hereinafter described, a rolling pin may be passed over the top of the pie plate to press the two crusts together and unite them, and divide the pie into a number of pieces or sections.

In order to crimp the edge of the pie and quickly and evenly unite the edges of the two crusts, I preferably employ in connection with the plate, a removable crimping ring 7. This ring may be of any desired shape according to the manner in which it is desired to crimp the pie, but as here shown, it is provided with radially-extending corrugations. It is preferably the same width as the horizontal portion 5 of the plate rim, and its outer diameter is slightly less than that of the upright edge or portion 6 of said rim, so that it will fit within the same and upon the portion 5, as shown in Fig. 1 and may be pressed down on the edges of the crusts to clamp them between it and the flange 5, whereby said edges are held together.

In using this pie plate, the bottom crust is first placed upon the top of the plate, the filling is then placed in the several sections, and the top crust then placed upon the filling. A rolling pin is then passed over the top crust, so that the crusts and filling will be forced into the sections of the plate, the two crusts being first pinched together around the edges of each of the sections, and finally severed to divide the pie into a plurality of sectors or pieces. The crimping ring 7 may then be placed in the position shown in Fig. 1 and pressed downwardly to crimp the outer edges of the sections of the pie. This rim may be left upon the pie while it is being baked, if desired.

Various changes in the form, proportion and the minor details of construction may be resorted to without departing from the principle or sacrificing any of the advantages of the invention, as defined by the appended claim.

Having thus described my invention, what I claim as new and desire to secure by Letters-Patent, is:—

A pie baking plate composed of sheet metal and comprising a bottom and an upstanding marginal rim, said plate having a plurality of integral vertically disposed radiating partitions upstruck from said bottom and subdividing the plate into a series of sector-shaped compartments, the partitions being of inverted V-shape in cross-section, presenting sharpened upper edges and having their lower sides open to permit free circulation of heat upward through the partitions, said rim being provided with a horizontal outturned marginal flange disposed in a plane below that of the upper edges of the partitions and having a continuous, vertically uprising marginal lip having its upper edge in a plane flush with that of the upper edges of the partitions, and a removable crimping ring designed to fit on said horizontal flange within the marginal lip.

In testimony whereof I have hereunto set my hand in presence of two subscribing witnesses.

ETHEL OTIS COOK.

Witnesses:
C. H. BESSENT,
WM. SYNNOTT.